(12) United States Patent
Chapski

(10) Patent No.: US 10,711,704 B2
(45) Date of Patent: Jul. 14, 2020

(54) FUEL CONTROL SYSTEM WITH SHUTOFF FEATURE

(71) Applicant: Hamilton Sundstrand Corporation, Charlotte, NC (US)

(72) Inventor: David L. Chapski, Southwick, MA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 1227 days.

(21) Appl. No.: 14/685,971

(22) Filed: Apr. 14, 2015

(65) Prior Publication Data

US 2016/0305338 A1 Oct. 20, 2016

(51) Int. Cl.

| | |
|---|---|
| F02C 9/28 | (2006.01) |
| F02C 7/232 | (2006.01) |
| F02C 9/26 | (2006.01) |
| F02C 9/46 | (2006.01) |
| F02C 7/262 | (2006.01) |
| F01D 21/02 | (2006.01) |

(52) U.S. Cl.
CPC ............... F02C 9/28 (2013.01); F01D 21/02 (2013.01); F02C 7/232 (2013.01); F02C 7/262 (2013.01); F02C 9/263 (2013.01); F02C 9/46 (2013.01); F05D 2260/606 (2013.01); F05D 2260/85 (2013.01); F05D 2270/092 (2013.01); F05D 2270/64 (2013.01)

(58) Field of Classification Search
CPC .... F02C 9/28; F02C 9/26; F02C 7/232; F02C 9/263; F02C 7/22; F02C 7/222; F02C 7/262; F16K 11/0716; F01D 21/02; F05D 2260/85; F05D 2260/606; F05D 2270/092; F05D 2270/64
See application file for complete search history.

(56) References Cited

U.S. PATENT DOCUMENTS

| | | | | |
|---|---|---|---|---|
| 449,359 | A | | 3/1891 | Birkiiolz |
| 3,672,163 | A | * | 6/1972 | White ................ F02C 7/26 60/39.281 |
| 4,449,359 | A | * | 5/1984 | Cole ................. F02C 7/22 60/39.094 |
| 4,493,187 | A | | 1/1985 | Hansen |
| 4,602,479 | A | | 7/1986 | Hansen |
| 4,760,662 | A | | 8/1988 | Dyer et al. |
| 5,133,181 | A | | 7/1992 | Moore |
| 5,241,826 | A | | 9/1993 | Stearns |
| 5,448,882 | A | | 9/1995 | Dyer et al. |
| 6,401,446 | B1 | | 6/2002 | Gibbons |
| 7,234,293 | B2 | * | 6/2007 | Yates ................. F02C 7/232 60/39.281 |

(Continued)

Primary Examiner — Alain Chau
(74) Attorney, Agent, or Firm — Carlson, Gaskey & Olds, P.C.

(57) ABSTRACT

A fuel control system according to an exemplary aspect of the present disclosure includes, among other things, a fuel delivery valve selectively moveable to a closed position to shut off a flow of fuel to a downstream location. The system further includes a windmill bypass valve, and a shutoff pressure line between the windmill bypass valve and the fuel delivery valve. The windmill bypass valve is selectively operable to direct fuel to the shutoff pressure line to assist the movement of the fuel delivery valve to the closed position. A method is also disclosed.

9 Claims, 3 Drawing Sheets

(56) References Cited

U.S. PATENT DOCUMENTS

| | | | |
|---|---|---|---|
| 7,251,925 B2* | 8/2007 | Paradise | F02C 7/228 60/39.281 |
| 7,252,068 B2* | 8/2007 | Eick | F02C 7/22 123/198 DB |
| 7,805,947 B2* | 10/2010 | Moulebhar | F01D 21/003 60/39.163 |
| 7,845,177 B2 | 12/2010 | Parsons | |
| 8,720,482 B2* | 5/2014 | Griffiths | F02C 7/232 137/489.5 |
| 8,991,186 B2* | 3/2015 | Bickley | F02C 7/232 60/233 |
| 9,140,191 B2* | 9/2015 | Haugsjaahabink | F02C 7/22 |
| 9,194,291 B2* | 11/2015 | Podgorski | F02C 6/08 |
| 2001/0027641 A1* | 10/2001 | Clarke | F02C 7/236 60/39.094 |
| 2010/0121553 A1* | 5/2010 | Milnes | F02C 9/28 701/100 |
| 2011/0253231 A1 | 10/2011 | Dore et al. | |
| 2014/0053927 A1 | 2/2014 | Podgorski et al. | |

* cited by examiner

FUEL CONTROL SYSTEM WITH SHUTOFF FEATURE

BACKGROUND

This disclosure generally relates to a system for controlling turbomachine fuel flow. Turbomachines, such as gas turbine engines, typically include at least a compression section, a combustor section, and a turbine section. Many engines include a fuel control system configured to deliver fuel to the combustor section. These systems may include a windmill bypass valve that directs fuel away from a fuel delivery valve, such as a minimum pressure shutoff valve (MPSOV), during engine shutdown. Further, the windmill bypass valve may maintain sufficient pressure (sometimes called "muscle" pressure) to position fuel control system components as well as various engine actuators during windmilling and start. Shutdown of the engine may occur on the ground or in flight during, for example, an over-speed condition.

One example fuel control system includes a windmill bypass valve selectively movable between an open position and a closed position. When in the open position, some fuel is directed away from an MPSOV, and thus the pressure of the fuel flowing to the MPSOV drops. This drop in pressure allows the MPSOV to close under the bias of a spring and shut off a flow of fuel to the engine.

SUMMARY

A fuel control system according to an exemplary aspect of the present disclosure includes, among other things, a fuel delivery valve selectively moveable to a closed position to shut off a flow of fuel to a downstream location. The system further includes a windmill bypass valve, and a shutoff pressure line between the windmill bypass valve and the fuel delivery valve. The windmill bypass valve is selectively operable to direct fuel to the shutoff pressure line to assist the movement of the fuel delivery valve to the closed position. A method is also disclosed.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows:

In FIG. 1, a fuel delivery valve is an open position such that fuel is allowed to flow to a downstream location.

In FIG. 3, the fuel delivery valve is in an open position.

DETAILED DESCRIPTION

Figure 1:
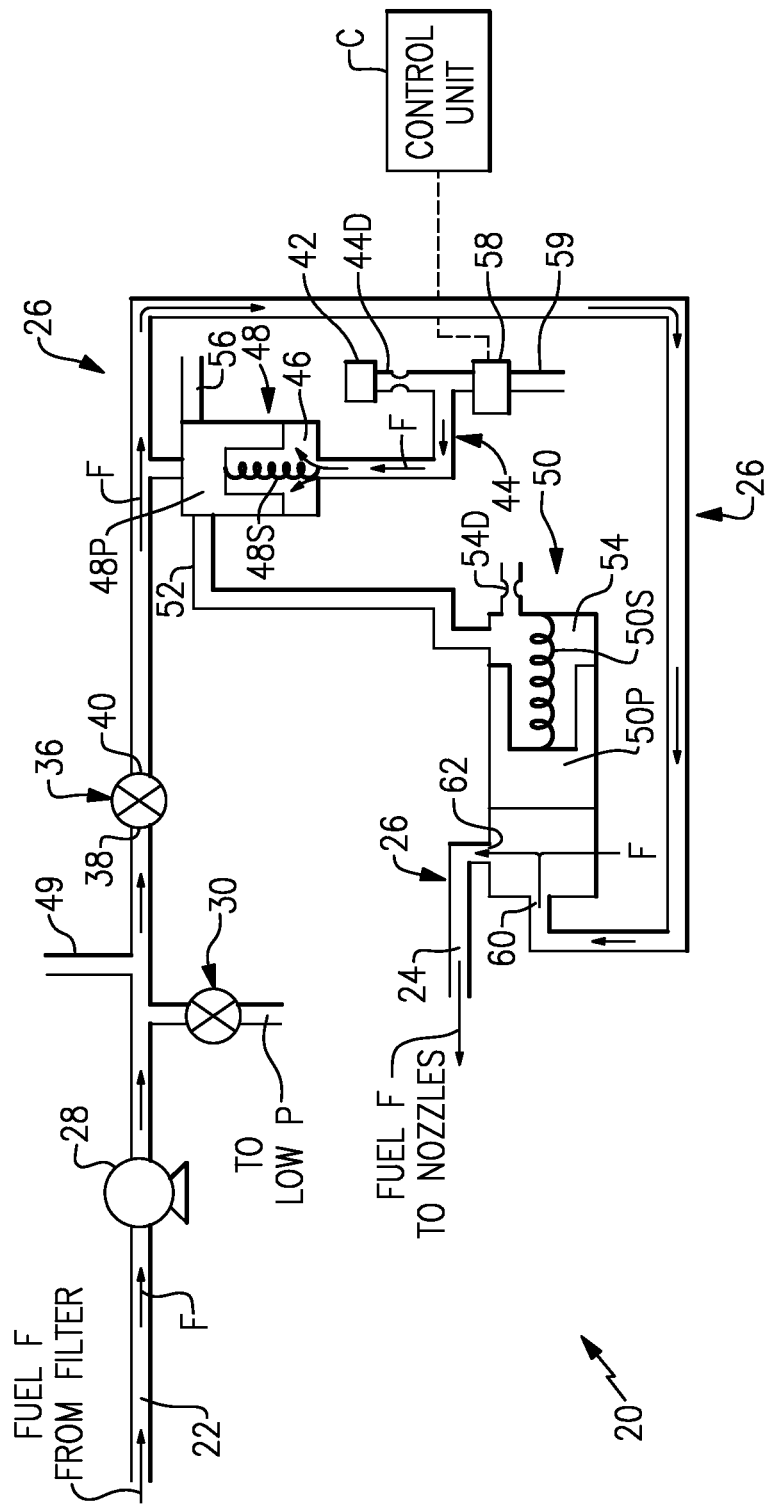
FIG. 1 schematically illustrates an example fuel control system.

FIG. 1 schematically illustrates an example fuel control system 20. In this example, the system 20 is arranged to provide a flow of fuel F generally from an upstream location, at 22, to a downstream location, at 24. In this example, the system 20 receives a flow of fuel F from a fuel filter at the upstream location 22. The downstream location 24 is fluidly coupled to fuel nozzles of a combustor section of a turbomachine, such as a gas turbine engine.

Between the upstream location 22 and the downstream location 24, the fuel F flows along a main fuel line 26. In this example, immediately downstream of the upstream location 22, there is a pump 28 configured to pressurize the fuel F. It should be understood that there may be additional pumps along the main fuel line 26.

Downstream of the pump 28, the main fuel line 26 is fluidly coupled to a pressure regulating valve 30. The pressure regulating valve 30 is illustrated schematically. This disclosure is not limited to any particular pressure regulating valve type.

A metering valve 36 is fluidly coupled downstream of the pressure regulating valve 30. The metering valve 36 has an inlet 38, a main outlet 40 fluidly coupled to the main fuel line 26. Further, like the pressure regulating valve 30, the metering valve 36 is also illustrated schematically. This disclosure extends to all types of metering valves 36.

A high pressure source 42 supplies fuel F to a shutdown line 44. The high pressure source 42 is illustrated schematically. The high pressure source 42 could originate from a location along the main fuel line 26 between the pump 28 and the metering valve 36. The shutdown line 44 could be supplied by fuel F from another high pressure source in other examples.

Figure 2:
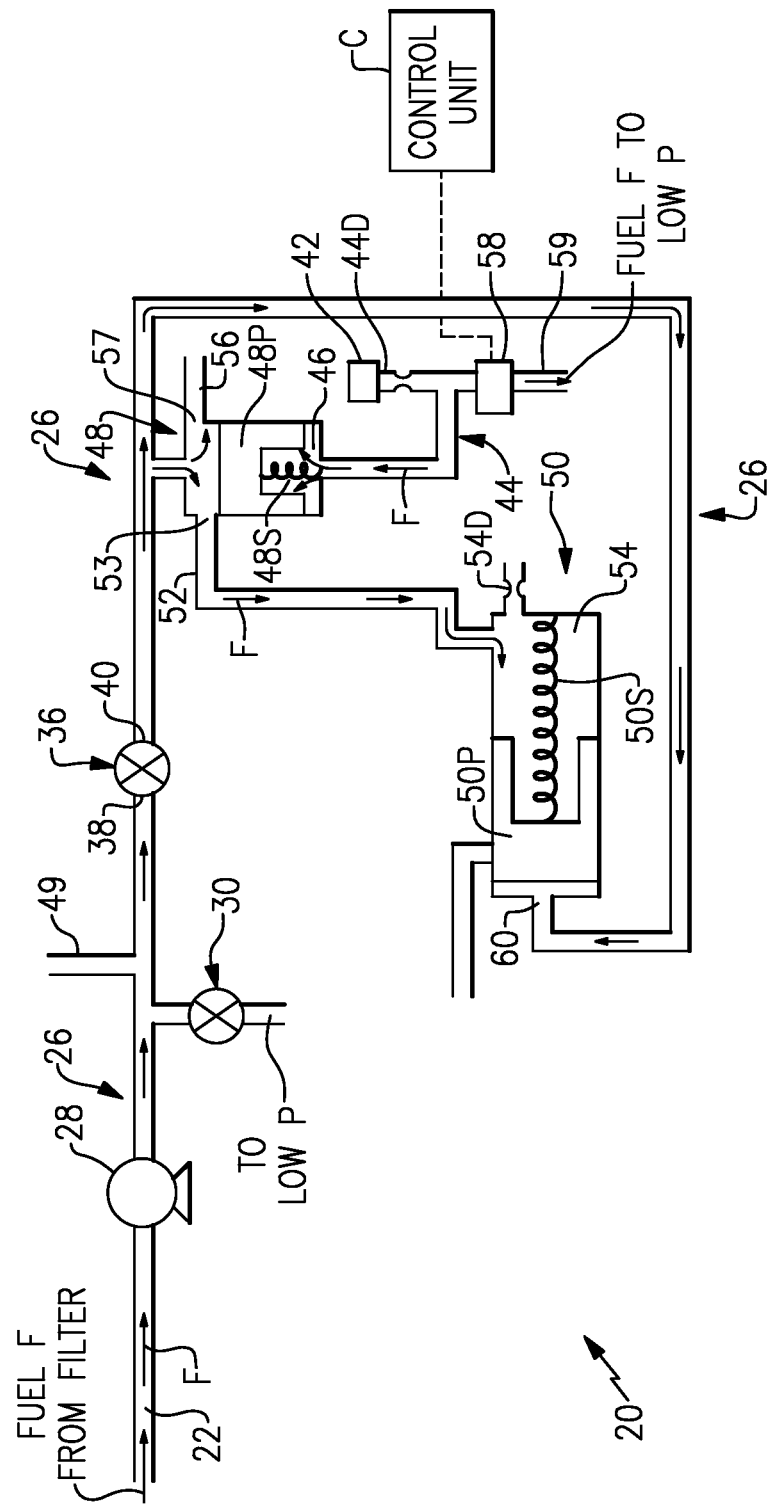
FIG. 2 schematically illustrates the system of FIG. 1, with the fuel delivery valve in a closed position such that fuel is prevented from flowing to the downstream location.

In this example, the shutdown line 44 is fluidly coupled to a spring chamber 46 of a windmill bypass valve 48. The shutdown line 44 further includes a shutoff orifice 44D fluidly coupled to the high pressure source 42, which essentially allows an electromechanical valve 58 (discussed below) to control the pressure in the shutdown line 44. The windmill bypass valve 48 includes a piston 48P and a spring 48S arranged in the spring chamber 46. The position of the piston 48P is dictated by the biasing force of the spring 48S and the pressure of the fuel F in the shutdown line 44. As the piston 48P moves, the windmill bypass valve 48 moves between a closed position (shown in FIG. 1) and an open position (FIG. 2).

In the closed position of FIG. 1, the piston 48P is positioned to direct all fuel F within the main fuel line 26 downstream of the windmill bypass valve 48 and to a fuel delivery valve, which in this example is a minimum pressure shutoff valve (MPSOV) 50. As is known in the art, an MPSOV is operable to ensure there is a minimum operating pressure in the fuel F before allowing a flow of fuel F to the downstream location 24 (e.g., the engine), and shuts off the fuel flow to downstream location 24 in certain modes of operation. The positioning of the MPSOV 50 is discussed in detail below, and is dictated by both a spring 50S and fuel within a pressure shutoff line 52.

When in the open position (FIG. 2), the windmill bypass valve 48 is fluidly coupled to a shutoff pressure line 52 via a first outlet 53, which is in communication with a spring chamber 54 of the MPSOV 50. The windmill bypass valve 48 is also fluidly coupled to a low pressure line 56 via a second outlet 57, which directs fuel F to a downstream location, such as pump interstage, for example. The windmill bypass valve 48 varies the flow of fuel F in line 56 to set pressure, which, when added to the metering valve 36 pressure drop (which is typically set by the pressure regulating valve 30), is directed to one or more actuators via a pressure line 49 to maintain sufficient pressure (sometimes called "muscle" pressure) to position those actuators during windmilling and engine start. Example actuators include a bleed actuator of an engine or a stator vane actuator. As is known, windmilling is a condition in which the rotatable elements of the gas turbine engine rotate under the force of the passing airstream.

When the windmill bypass valve 48 is closed (FIG. 1), fuel F is directed to the downstream location 24 via the MPSOV 50. The MPSOV 50 has an inlet 60 and an outlet 62. The MPSOV further includes a piston 50P and a spring 50S within the spring chamber 54. The spring chamber 54 is in communication with a damping orifice 54D to allow the spring chamber 54 to breathe. The damping orifice 54D is fluidly coupled to a low pressure location. When the MPSOV 50 is open, the piston 50P is positioned to allow fuel F to flow from the inlet 60, to the outlet 62, and ultimately to the downstream location 24.

In one example, in order to effect movement of the piston 48P (and, in turn, move the windmill bypass valve 48 between the open and closed positions), the pressure of the fuel F within the spring chamber 46 is adjusted. In one example, the shutdown line 44 is fluidly coupled to an electromechanical valve 58, which may include a servo, and which is electrically coupled to a control unit C. The electromechanical valve 58 is operable to relieve the pressure in the shutdown line 44 by directing the fuel F to a low pressure location 59. To build or maintain pressure in the shutdown line 44, the electromechanical valve 58 does not allow any fuel F to flow to the low pressure location 59. While the illustrated example includes a shutoff orifice 44D supplied by a high pressure source 42 and a two-way electromechanical valve 58 coupled to a low pressure location 59, this disclosure could employ a three-way electromechanical valve.

The control unit C may be any known type of controller including memory, hardware, and software. The control unit C is configured to store instructions and to provide instructions to the various components of the fuel control system 20, including the electromechanical valve 58. The control unit C may be part of a main controller of an engine, or may receive instructions from such a controller.

During engine shutdown, which may occur on the ground or in flight during, for example, an over-speed condition, the control unit C provides instructions to the electromechanical valve 58 to direct a portion of the fuel F within the shutdown line 44 to the low pressure location 59. Doing so decreases the pressure of the fuel F within the spring chamber 46. In response, the piston 48P is moved to the open position of FIG. 2. An over-speed condition may be the result of some type of system failure. An example could include if a computer (or controller) of an engine failed and commanded the metering valve 36 towards a higher than required fuel flow.

While moving to its the open position, the windmill bypass valve 48 is fluidly coupled to the shutoff pressure line 52 and the low pressure line 56. As shown in FIG. 2, the fuel F flows within the shutoff pressure line 52 into the spring chamber 54 of the MPSOV 50. This relatively high pressure fuel urges the piston 50P of the MPSOV 50 toward the closed position (e.g., in the left hand direction, relative to FIG. 2). When the MPSOV is closed (FIG. 2), fuel F is not allowed to flow beyond the inlet 60 of the MPSOV 50. Thus, the MPSOV 50 shuts off flow to the downstream location 24.

In order to resume engine operation, the control unit C provides instructions to the electromechanical valve 58 to cease directing fuel F to the low pressure location 59. Pressure then builds in the spring chamber 46, which moves the piston 48P back to the closed position of FIG. 1. As the windmill bypass valve 48 closes, fuel is no longer directed to the shutoff pressure line 52, and the piston 50P is allowed to move to the open position of FIG. 1.

Another feature of the windmill bypass valve 48 is the relative vertical arrangement of the outlets 53 and 57. As illustrated, the outlet 57 is vertically spaced-apart, and in this example is above, the outlet 53. Thus, when the windmill bypass valve 48 closes, the outlet 53 closes first, which allows the MPSOV 50 to open before cutting off pressure to the low pressure line 56. This prevents a pressure spike (also sometimes referred to as "water hammer") in the main fuel line 26. Further, when opening the windmill bypass valve, the positioning of the outlets 53 and 57 essentially prioritizes a flow of fuel F to the low pressure line 56 when in an over-speed condition, for example.

Providing the flow of fuel F to the MPSOV 50 via the shutoff pressure line 52 allows the MPSOV 50 to rapidly close, which increases the effectiveness of the MPSOV 50. Further, the outlet 53 of the windmill bypass valve 48 can be sized to limit the rate at which fuel F flows to the fuel nozzles and thereby limiting the subsequent pressure spike in the fuel system.

Figure 3:
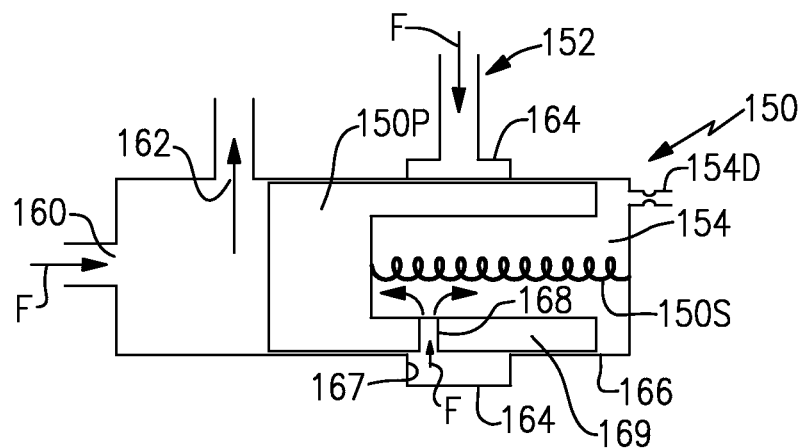
FIG. 3 schematically illustrates an alternative fuel delivery valve arrangement.

FIG. 3 illustrates a second example MPSOV 150 according to this disclosure in an open position. Corresponding structures from the first example MPSOV 50 of FIGS. 1 and 2 are preappended with a "1" in FIGS. 3 and 4.

Figure 4:
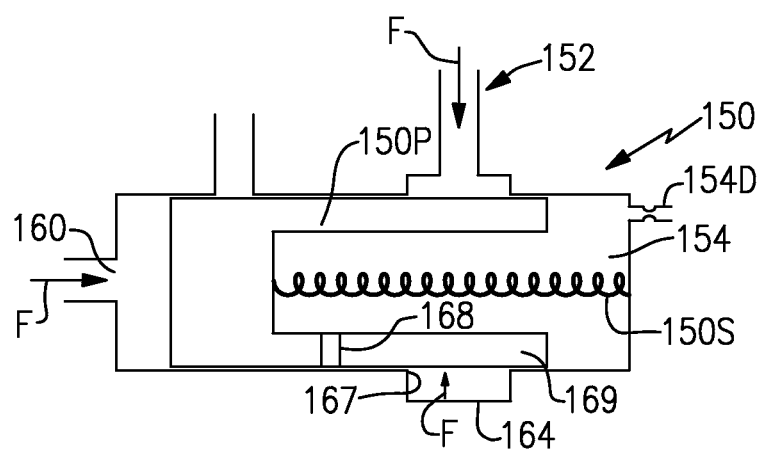
FIG. 4 schematically illustrates the fuel delivery valve of FIG. 3, with the fuel delivery valve in a closed position.

In this example, the shutoff pressure line 152 is fluidly coupled to an annulus 164 circumferentially disposed about an outer housing 166 of the MPSOV 150. Further, an metering edge 167 is provided in the outer housing 166, and an orifice 168 is provided within a spring receipt portion 169 of the piston 150P. When the MPSOV 150 is open, the orifice 168 is aligned relative to the metering edge 167 to allow fuel F to enter the spring chamber 154 (e.g., the orifice 168 is on the right hand side of the metering edge 167). During an engine shutdown, for example, the fuel F enters the spring chamber 154 and urges the piston 150P toward the closed position substantially as described above. The closed position is illustrated in FIG. 4.

In the closed position, the orifice 168 is not aligned with the annulus 164. In particular, a portion of the piston 150P (e.g., the spring receipt portion 169) substantially blocks annulus 164 from communicating fuel F into the spring chamber (e.g., the orifice 168 is arranged on the left hand side of the metering edge 167). Thus, fuel F is not allowed to enter the spring chamber 154. Preventing flow into the spring chamber 154 when resuming engine operation allows the piston 150P to move back to the open position without needing to overcome the pressure from the shutoff pressure line 152, which could lead to a momentary delay in opening the MPSOV 150 and cause a pressure spike in the mail fuel line 26 upstream of the MPSOV 150. The arrangement of FIGS. 3-4 provides for the rapid shut off of the MPSOV 150 while also reducing the likelihood of a pressure spike during engine start in the event the windmill bypass valve 48 is in an open position.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A fuel control system, comprising:
   a fuel delivery valve selectively moveable to a closed position to shut off a flow of fuel to a downstream location;
   a windmill bypass valve; and
   a shutoff pressure line between the windmill bypass valve and the fuel delivery valve, the windmill bypass valve selectively operable to direct fuel to the shutoff pressure line to assist the movement of the fuel delivery valve to the closed position.

2. The system as recited in claim 1, wherein:
   the fuel delivery valve is a minimum pressure shutoff valve (MPSOV);
   the windmill bypass valve is selectively operable to direct fuel to a low pressure line; and
   a first outlet of the windmill bypass valve fluidly coupled to the shutoff pressure line is vertically spaced-apart from a second outlet of the windmill bypass valve fluidly coupled to the low pressure line.

3. The system as recited in claim 1, further comprising a valve and a control unit configured to selectively provide instructions to the valve to open and close the windmill bypass valve.

4. The system as recited in claim 1, further comprising:
   a metering valve;
   a shutdown line fluidly coupled to a spring chamber of the windmill bypass valve; and
   an electromechanical valve operable to adjust a pressure in the shutdown line to move the windmill bypass valve between the open position and the closed position.

5. The system as recited in claim 1, wherein the downstream location is a combustor section of a gas turbine engine.

6. The system as recited in claim 1, wherein, when the windmill bypass valve is in an open position, the shutoff pressure line is fluidly coupled to a spring chamber of the fuel delivery valve only when the fuel delivery valve is in an open position.

7. The system as recited in claim 6, wherein:
   the fuel delivery valve includes an annulus in an outer housing thereof;
   a piston within the fuel delivery valve includes an orifice; and
   when the fuel delivery valve is in the open position, the annulus and the orifice align such that the fuel from the shutoff pressure line is allowed to enter the spring chamber.

8. The system as recited in claim 7, wherein, when the fuel delivery valve is in the closed position, the annulus and the orifice are not aligned such that the fuel from the shutoff pressure line is prevented from entering the spring chamber.

9. The system as recited in claim 7, wherein the shutoff pressure line is fluidly coupled to the annulus surrounding the outer housing, and wherein fuel is communicated into the spring chamber through the annulus.

* * * * *